United States Patent
Wu et al.

(10) Patent No.: US 7,105,578 B2
(45) Date of Patent: Sep. 12, 2006

(54) BLOWING AGENT BLENDS

(75) Inventors: Jinhuang Wu, Norristown, PA (US); Douglas R. Dillon, Norristown, PA (US)

(73) Assignee: Arkema Inc., Philadelphia, PA (US)

( * ) Notice: Subject to any disclaimer, the term of this patent is extended or adjusted under 35 U.S.C. 154(b) by 0 days.

(21) Appl. No.: 10/253,242

(22) Filed: Sep. 24, 2002

(65) Prior Publication Data

US 2003/0225165 A1 Dec. 4, 2003

Related U.S. Application Data

(63) Continuation-in-part of application No. 10/162,146, filed on Jun. 3, 2002.

(51) Int. Cl.
*C08G 18/00* (2006.01)
*C08G 18/08* (2006.01)
*C08K 3/00* (2006.01)

(52) U.S. Cl. .................... 516/12; 252/182.24; 510/412; 510/415; 521/131

(58) Field of Classification Search .................. 516/12; 252/182.24; 510/412, 415; 521/131, 98
See application file for complete search history.

(56) References Cited

U.S. PATENT DOCUMENTS

| | | | |
|---|---|---|---|
| 5,001,164 A | 3/1991 | Smits et al. | 521/131 |
| 5,196,137 A | 3/1993 | Merchant | 252/67 |
| 5,607,912 A | 3/1997 | Samejima et al. | 510/411 |
| 5,723,509 A * | 3/1998 | Werner et al. | |
| 6,288,135 B1 * | 9/2001 | Bement et al. | 521/174 |
| 6,358,434 B1 | 3/2002 | Wu et al. | |
| 6,472,444 B1 * | 10/2002 | Harris et al. | |
| 2002/0061935 A1 * | 5/2003 | Harris et al. | |

FOREIGN PATENT DOCUMENTS

| | | |
|---|---|---|
| EP | 1 186 627 A | 3/2002 |
| WO | WO 97 41189 A | 11/1997 |

* cited by examiner

*Primary Examiner*—Irina S. Zemel
(74) *Attorney, Agent, or Firm*—Steven D. Boyd

(57) ABSTRACT

Foam blowing agent blends of trans-1,2-dichloroethylene and one or more pentanes are provided, as are polyol premixes and foam compositions containing such blends. The resulting foams exhibit dramatic improvement in fire resistance.

14 Claims, No Drawings

BLOWING AGENT BLENDS

This application is a continuation-in-part of application Ser. No. 10/162,146 filed Jun. 3, 2002.

BACKGROUND OF THE INVENTION

This invention relates to foam blowing agent blends of trans-1,2-dichloro-ethylene ("Trans 12") with one or more pentanes, and to polyol premixes and foam compositions containing such blends, more specifically to blends of Trans 12 with one or more of n-pentane ("n-C5"), i-pentane ("i-C5") and cyclopentane ("c-C5"). The foam blowing agent blends are particularly useful for making closed cell polymer (insulation) foams having improved fire resistance, such as polystyrene, phenolic and polyurethane foams.

Chlorofluorocarbons ("CFCs") had been used as blowing agents for rigid, closed cell insulation foams for many years because they offer outstanding fire resistance in addition to good thermal insulation. However, CFCs have been phased out because they are said to be detrimental to the ozone layer. Zero ozone depletion alternatives such as pentanes have been identified, but pentanes are highly flammable and their resulting foams suffer undesirable fire performance properties. It is increasingly difficult for pentane blown foams to meet stringent fire performance requirements, so that yet another alternative with better fire resistance performance is desirable.

BRIEF SUMMARY OF THE INVENTION

Foam blowing agent compositions are provided, which compositions comprise Trans 12 and at least one pentane selected from the group consisting of n-C5, i-C5 and c-C5 (preferably c-C5), as well as foam premix and polyurethane foam compositions comprising a polyol and the blowing agent composition.

DETAILED DESCRIPTION

It has now been found that the foregoing blends of pentanes with Trans 12 dramatically improves fire resistance of pentane blown foams, as well as improving the initial k-factor (thermal conductivity) of such foams. As noted above, these blends are particularly useful for making closed cell polymer (insulation) foams having improved fire resistance, such as polystyrene, phenolic and polyurethane foams. In addition to the Trans 12/cyclopentane blend, the data below confirm the utility of blends of Trans 12 with n-C5, i-C5, n-C5/i-C5 mixtures, and c-C5/i-C5 mixtures.

Trans 12 generally makes up greater than 1 mole % of the blends, preferably about 5 to 25 mole %. A practical upper limit on the amount of Trans 12 is about 40 to 45 mole %.

In the premix compositions the blowing agent blend is typically present in a concentration range of about 2–60 weight % (preferably 5–40 weight %), based on the weight of the polyol.

In polyurethane foam compositions, the effective concentrations of the blends are typically about 0.1–25 weight % (preferably 0.5–15 weight %), based on the weight of the total polyurethane foam formulation.

The blowing agent can be distributed between the "A" and "B" sides of the foam composition. All or a portion of it can also be added at the time of injection.

The other components of the premix and foam formulations may be those which are conventionally used, which components and their proportions are well known to those skilled in the art. For example, fire retardants, surfactants and polyol are typical components of the B-side, while the A-side is primarily comprised of polyisocyanate. Water is frequently used as a coblowing agent. The A and B sides are typically mixed together, followed by injection of the catalyst, after which the mixture is poured into a mold or box.

The practice of the invention is illustrated in more detail in the following Non-limiting examples. The formulations used (all having an Iso Index of 300) each contained 170.51 parts M-489, a polymeric methane diphenyl diisocyanate available from Bayer Corporation; 100 parts PS2352, a polyester polyol having a hydroxyl number of 230–250 available from the Stepan Company; 0.16 part PC-5 and 0.29 part PC-46, which are, respectively, pentamethyldiethylenetriamine and potassium acetate in ethylene glycol, catalysts available from Air Products; 2.57 parts K-15, potassium octoate in dipropylene glycol, a catalyst available from Air Products; 2 parts B-8462, a polysiloxane-polyether copolymer surfactant available from Goldschmidt Chemical Corporation; 10 parts AB-80, a tris(1-chloro-2-propyl) phosphate fire retardant available from Albright & Wilson Americas, Inc.; and about 22–24 parts blowing agent, the exact amounts of which are more particularly set forth below; all parts are by weight.

The A-side (M489) and B-side (a mixture of the polyol, surfactant, fire retardant and blowing agents) were each cooled to 10° C., then mixed, after which the catalyst mixture was injected. After further mixing for about 18 seconds, the mixture was poured into a box. A Mobil 45 fire resistance performance test was then performed on samples of the resulting foams. In this test samples are weighed before and after exposure to a burner and the weight loss percentage is calculated. The less the weight loss, the better the fire performance. A one inch thick core foam sample was used to determine thermal conductivity (k-factor) of the foam. K-factor measurement is conducted according to ASTM C518. The lower the k-factor the better the foam's thermal performance.

EXAMPLE 1

Trans 12/c-C5 Blends

In this example the performance of c-C5 alone (21.7 parts) is compared to that of the three blends shown in Table I below:

TABLE I

| Parts & Mole % (of Trans 12) of Blowing Agent in Invention Examples | | | |
|---|---|---|---|
| c-C5 | 20.62 | 19.53 | 16.28 |
| Trans 12 parts | 1.50 | 3.01 | 7.52 |
| Trans 12 mole % | 5 | 10 | 25 |

The fire resistance weight loss results are shown in Table II:

TABLE II

| Mobil 45 Fire Resistance Weight Loss % Results: | |
|---|---|
| c-C5 alone: | 10.3% |
| c-C5 with 5 mole % Trans 12 | 6.1% |
| c-C5 with 10 mole % Trans 12: | 8.6% |
| c-C5 with 25 mole % Trans 12: | 3.0% |

The foam made with c-C5 alone had an initial k-factor of 0.157 Btu.in./ft$^2$.h.° F. at 24° C., while the foams made with the 3 levels of Trans 12 had k-factors of 0.153, 0.153 and 0.149, respectively.

EXAMPLE 2

Trans 12/n-C5 Blends

In this example the performance of n-C5 alone (22.32 parts) is compared to that of the two blends shown in Table III below:

TABLE III

| Parts & Mole % (of Trans 12) of Blowing Agent in Invention Examples | | |
|---|---|---|
| n-C5 | 20.09 | 16.74 |
| Trans 12 parts | 3.01 | 7.52 |
| Trans 12 mole % | 10 | 25 |

The fire resistance weight loss results are shown in Table IV:

TABLE IV

| Mobil 45 Fire Resistance Weight Loss % Results: | |
|---|---|
| n-C5 alone: | 7.3% |
| n-C5 with 10 mole % Trans 12 | 5.6% |
| n-C5 with 25 mole % Trans 12: | 3.3% |

The foam made with n-C5 alone had an initial k-factor of 0.164 Btu.in./ft$^2$.h.° F. at 24° C., while the foams made with the 2 levels of Trans 12 had k-factors of 0.160 and 0.157, respectively.

EXAMPLE 3

Trans 12/i-C5 Blends

In this example the performance of i-C5 alone (22.32 parts) is compared to that of the two blends shown in Table V below:

TABLE V

| Parts & Mole % (of Trans 12) of Blowing Agent in Invention Examples | | |
|---|---|---|
| i-C5 | 20.09 | 16.74 |
| Trans 12 parts | 3.01 | 7.52 |
| Trans 12 mole % | 10 | 25 |

The fire resistance weight loss results are shown in Table VI:

TABLE VI

| Mobil 45 Fire Resistance Weight Loss % Results: | |
|---|---|
| i-C5 alone: | 5.1% |
| i-C5 with 10 mole % Trans 12 | 4.0% |
| i-C5 with 25 mole % Trans 12: | 3.1% |

The foam made with i-C5 alone had an initial k-factor of 0.158 Btu.in./ft$^2$.h.° F. at 24° C., while the foams made with the 2 levels of Trans 12 each had a k-factor of 0.157.

EXAMPLE 4

Trans 12/Hydrosol™ Blends (Hydrosol is the Tradename of TotalFinaElf for a Pentane Blend Containing about 22–25% i-C5 and About 75–78% n-C5)

In this example the performance of Hydrosol alone (22.32 parts) is compared to that of the two blends shown in Table VII below:

TABLE VII

| Parts & Mole % (of Trans 12) of Blowing Agent in Invention Examples | | |
|---|---|---|
| Hydrosol | 20.09 | 16.74 |
| Trans 12 parts | 3.01 | 7.52 |
| Trans 12 mole % | 10 | 25 |

The fire resistance weight loss results are shown in Table VIII:

TABLE VIII

| Mobil 45 Fire Resistance Weight Loss % Results: | |
|---|---|
| Hydrosol alone: | 9.6% |
| Hydrosol with 10 mole % Trans 12 | 7.4% |
| Hydrosol with 25 mole % Trans 12: | 4.3% |

The foam made with Hydrosol alone had an initial k-factor of 0.161 Btu.in./ft$^2$.h.° F. at 24° C., while the foams made with the 2 levels of Trans 12 had k-factors of 0.158 and 0.157, respectively.

EXAMPLE 5

Trans 12/Hydrosol™ 15 Blends (Hydrosol 15 is the Tradename of TotalFinaElf for a Pentane Blend Containing About 15–19% i-C5 and About 81–85% n-C5)

In this example the performance of Hydrosol 15 alone (22.32 parts) is compared to that of the two blends shown in Table IX below:

TABLE IX

| Parts & Mole % (of Trans 12) of Blowing Agent in Invention Examples | | |
|---|---|---|
| Hydrosol 15 | 20.09 | 16.74 |
| Trans 12 parts | 3.01 | 7.52 |
| Trans 12 mole % | 10 | 25 |

The fire resistance weight loss results are shown in Table X:

TABLE X

| Mobil 45 Fire Resistance Weight Loss % Results: | |
|---|---|
| Hydrosol 15 alone: | 6.4% |
| Hydrosol 15 with 10 mole % Trans 12 | 4.3% |
| Hydrosol 15 with 25 mole % Trans 12: | 3.5% |

The foam made with Hydrosol 15 alone had an initial k-factor of 0.159 Btu.in./ft$^2$.h.° F. at 24° C., while the foams made with the 2 levels of Trans 12 had k-factors of 0.158 and 0.155, respectively.

EXAMPLE 6

Trans 12/c-C5/i-C5 Blends

In this example the performance of a c-C5/i-C5 blend alone (10.85 parts of c-C5 and 11.16 parts of i-C5) is compared to that of the two blends shown in Table XI below:

TABLE XI

Parts & Mole % (of Trans 12) of Blowing Agent in Invention Examples

| | | |
|---|---|---|
| c-C5 | 9.77 | 8.14 |
| i-C5 | 10.04 | 8.37 |
| Trans 12 parts | 3.01 | 7.52 |
| Trans 12 mole % | 10 | 25 |

The fire resistance weight loss results are shown in Table XII:

TABLE XII

Mobil 45 Fire Resistance Weight Loss % Results:

| | |
|---|---|
| c-C5/i-C5 alone: | 7.3% |
| c-C5/i-C5 with 10 mole % Trans 12 | 5.1% |
| c-C5/i-C5 with 25 mole % Trans 12: | 3.6% |

The foam made with c-C5/i-C5 alone had an initial k-factor of 0.154 Btu.in./ft$^2$.h.° F. at 24° C., while the foams made with the 2 levels of Trans 12 had k-factors of 0.150 and 0.149, respectively.

We claim:

1. A foam blowing agent composition consisting essentially of trans-1,2-dichloroethylene, at least one pentane selected from the group consisting of n-pentane, i-pentane and cyclopentane and optionally water.

2. A foam blowing agent composition consisting essentially of trans-1,2-dichloroethylene, cyclopentane and optionally water.

3. A foam blowing agent composition comprising trans-1,2-dichloroethylene, n-pentane and optionally water.

4. A foam blowing agent composition comprising trans-1,2-dichloroethylene, i-pentane and optionally water.

5. A foam blowing agent composition comprising trans-1,2-dichloroethylene, a blend of n-pentane and i-pentane and optionally water.

6. A foam blowing agent composition comprising trans-1,2-dichloroethylene, a blend of cyclopentane and i-pentane and optionally water.

7. A foam premix composition comprising a polyol and the foam blowing agent composition of claim 1.

8. The foam premix composition of claim 7 wherein the pentane is cyclopentane.

9. The foam premix composition of claim 7 wherein the pentane is n-pentane.

10. The foam premix composition of claim 7 wherein the pentane is i-pentane.

11. The foam premix composition of claim 7 wherein the pentane is a blend of n-pentane and i-pentane.

12. The foam premix composition of claim 7 wherein the pentane is a blend of cyclopentane and i-pentane.

13. A foam blowing agent composition comprising trans-1,2-dichloroethylene, at least one pentane selected from the group consisting of n-pentane and i-pentane and optionally water.

14. A foam premix composition comprising a polyol and the foam blowing agent composition of claim 13.

* * * * *